Patented Nov. 26, 1940

2,222,749

UNITED STATES PATENT OFFICE 2,222,749

DISAZO DYESTUFFS AND THEIR MANUFACTURE

Adolf Krebser, Riehen, near Basel, Switzerland, assignor to the firm J. R. Geigy A. G., Basel, Switzerland No Drawing. Application July 15, 1939, Serial No. 284,740. In Switzerland July 19, 1938

12 Claims. (Cl. 260—191)

The U. S. patent application Ser. No. 207,149, filed May 10, 1938, describes valuable red-violet to red-blue disazo-dyestuffs based on the following general formula:

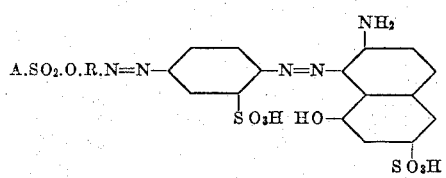

The U. S. patent application Ser. No. 257,721, filed February 21, 1939, refers to similar, violet to violet-blue disazo-dyestuffs of the following general formula:

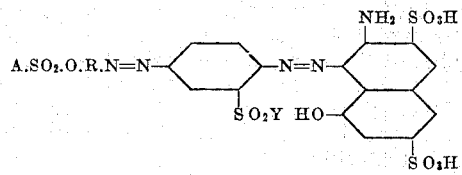

In these two formulae A means an aromatic radical, R means the radical of a phenol coupled in p-position and Y means the hydroxyl- and amide group, or the amide group substituted by alkyl- or aryl groups, further an alkyl-, aralkyl- or aryl radical.

Now it has been further found that the dyestuffs of the general formula:

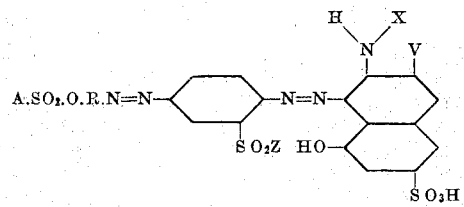

wherein A means an aromatic radical of the benzene series, R means the radical of a phenol coupled in p-position, X represents hydrogen or an alkyl group, V represents hydrogen or a sulphonic acid group, X being hydrogen if V consists of a sulphonic acid group, and Z represents an aromatic radical of the benzene series containing a sulphonic acid group, such as a N-monoalkylated phenylamide group or a phenyl radical, also possess valuable properties and are similar to the dyestuffs cited in the aforesaid applications. By the introduction of a sulphonic acid group into the sulpho-N-alkylphenylamide group or into the phenylsulphone group it is for example possible to produce with γ-acid and its monoalkyl derivatives still well soluble dyestuffs.

The new dyestuffs give in dyeing or printing in general navy-blue to green-blue shades and have very good fastness properties. Their manufacture is performed according to the different processes indicated in the aforesaid applications, by using the sulphonic acids of nitro-aminodiphenylsulphones or nitroaminobenzenesulphalkylarylides.

The following examples illustrate the invention, the parts being by weight:

Example 1

35.8 parts of 5-nitro-2-amino-1:1'-diphenylsulphone-3'-sulphonic acid are diazotised in aqueous solution according to known methods and coupled with 25.3 parts of 2-methylamino-8-naphthol-6-sulphonic acid in weakly mineral- or acetic acid solution. After the formation of the dyestuff is achieved, the mass is rendered neutral by means of sodium carbonate, the clear solution is heated to 55° C. and the nitro group is reduced by means of 11.7 parts of sodium sulphide of 100% strength. The aminomonoazo-dyestuff is thereupon diazotised with 6.5 parts of nitrite and 40 parts of hydrochloric acid of 30% strength at 0° C. and combined with a sodaalkaline solution of 9.5 parts of phenol. The combination is achieved within a short time. The mass is heated to 75° C., treated with sodium carbonate in excess, than with 40 parts of p-toluenesulphonic acid chloride and kept at this temperature until the esterification is complete. Then it is salted out, filtered and dried. The new dyestuff, which constitutes a blue powder, is soluble in hot water with green-blue and in concentrated sulphuric acid with blue coloration and dyes wool and silk from acid bath beautiful blue-green shades fast to light.

If instead of phenol m-cresol, 1:3:6-xylenol or other in p-position coupling substitution products of the phenol and instead of p-toluenesulphonic acid chloride other arylsulphonic acid chlorides, such as benzene- or p-chlorobenzenesulphonic acid chloride etc., are used, similar dyestuffs will be obtained.

Instead of 2-methylamino-8-naphthol-6-sulphonic acid the 2-ethyl- or hydroxyethylamino-8-naphthol-6-sulphonic acid may be used with the same result. Instead of 5-nitro-2-amino-1:1'-diphenylsulphone-3'-sulphonic acid there may also be used the corresponding 5-nitro-2-amino-1:1'-phenyl-tolyl (or m-xylyl-) sulphone-3'-sulphonic acid. The production of these latter two compounds can be performed in a similar manner to that of the diphenlysulphone mentioned in the above example.

*Example 2*

35.8 parts of 5-nitro-2-amino-1:1'-diphenyl-sulphone-3-sulphonic acid are diazotised and combined in acid solution with 31.9 parts of 2-amino-8-naphthol-3:6-disulphonic acid. The formed monoazodyestuff is reduced at 60° C. with the necessary quantity of sodium sulphide and thereupon diazotised with 6.5 parts of nitrite and 40 parts of hydrochloric acid of 30% strength at 0° C. There are then added to the diazonium compound 9.5 parts of m-cresol and thereupon rapidly 40 parts of sodium carbonate. When the coupling is achieved, the whole is heated to 75° C. and esterification is performed by means of 45 parts of p-toluenesulphonic acid chloride. By salting out, filtration and drying a blue powder is obtained which dissolves in water with blue and in concentrated sulphuric acid with green-blue coloration and dyes wool and silk fast, reddish-blue shades.

A similar dyestuff is obtained if instead of the 5-nitro-2-amino-1:1'-diphenylsulphone-3'-sulphonic acid 40.1 parts of 4-nitro-1-amino-2-sulphethyl- or -methyl-anilide-3'-sulphonic acid is used. This compound may for example be prepared by causing 5-nitro-2-chlorobenzene-sulphonic acid chloride to react with monoethyl-metanilic acid and replacing the halogen by the amino group in the autoclave. Likewise the 2-sulphomethyl- or -ethyl-o-, -m- or -p-toluidide compounds are usable. Similar or analogous dyestuffs are obtained by the variations cited in Example 1.

*Example 3*

40.1 parts of 4-nitro-1-amino-2-sulphethyl-anilide-3'-sulphonic acid are diazotised in aqueous solution and coupled in acid solution with 23.9 parts of 2-amino-8-naphthol-6-sulphonic acid. After reduction of the nitro-monoazodyestuff by means of sodium sulphide at 50° C., the mass is diazotised with 6.5 parts of nitrite and 40 parts of hydrochloric acid of 30% strength and combined to the disazo-dyestuff with 9.5 parts of phenol in sodaalkaline solution. After short time the coupling is achieved, the whole is heated to 75° C. and esterification is performed by means of 45 parts of p-toluenesulphonic acid chloride. The dyestuff solution is rendered weakly acid and salted out. The new dyestuff, a blue powder, is soluble in water with blue-violet and in concentrated sulphuric acid with blue coloration and dyes wool and silk beautiful, navy-blue shades. By variation of the diazo-, phenol- or aryl-sulphonic acid chloride components, such as they are for example given in the Examples 1 and 2, disazodyestuffs with similar properties can be produced.

With respect to the preparation of the starting material, 201 parts of ethylmetanilic acid are treated in presence of an excess of acetate in aqueous solution at 75° C. with 305 parts of 5-nitro-2-chlorobenzenesulphochloride. After the reaction is achieved, the 4-nitro-1-chloro-2-sulphethyl-anilide-3'-sulphonic acid is precipitated by means of potassium chloride and filtered. Thereupon the chlorine is exchanged in the autoclave with ammonia in excess at 160° C. The obtained potassium salt of the 4-nitro-1-amino-2-sulph-ethylanilide-3'-sulphonic acid is easily soluble in hot water, more difficultly soluble in cold water. It crystallises out in form of thin pale-greenish leaves.

What I claim is:

1. Disazo-dyestuffs of the formula

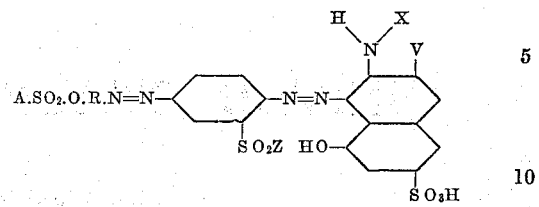

wherein A means an aromatic radical of the benzene series, R the radical of a phenol coupled in p-position, X means a member of the group consisting of hydrogen and alkyl, V means a member of the group consisting of hydrogen and a sulphonic acid group (X being hydrogen if V is a sulphonic acid group) and Z represents a radical of the group consisting of an amino-phenyl-sulphonic acid radical connected through the amino group with the $SO_2$-group and a phenylsulphonic acid radical connected through a nuclear carbon atom with the $SO_2$-group.

2. Disazo-dyestuffs of the formula

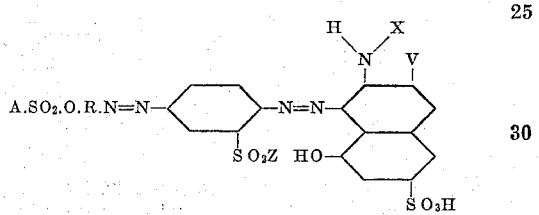

wherein A means an aromatic radical of the benzene series, R the radical of a phenol coupled in p-position, X means a member of the group consisting of hydrogen and alkyl, V means a member of the group consisting of hydrogen and a sulphonic acid group (X being hydrogen if V is a sulphonic acid group) and Z represents a N-monoalkylated phenylamide radical containing a sulphonic acid group.

3. Disazo-dyestuffs of the formula

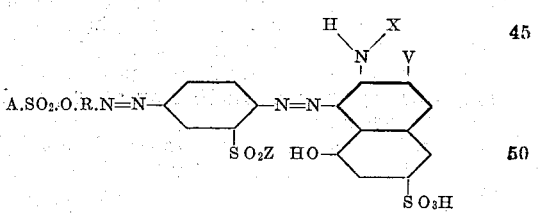

wherein A means an aromatic radical of the benzene series, R the radical of a phenol coupled in p-position, X means a member of the group consisting of hydrogen and alkyl, V means a member of the group consisting of hydrogen and a sulphonic acid group (X being hydrogen if V is a sulphonic acid group) and Z represents a phenyl radical containing a sulphonic acid group.

4. A process for the manufacture of disazo-dyestuffs, which comprises combining a diazotised monoazo-dyestuff of the formula

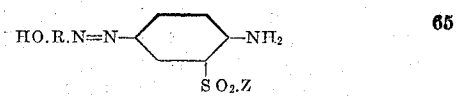

wherein R represents the radical of a phenol coupled in p-position and Z represents a radical of the group consisting of an amino-phenyl-sulphonic acid radical connected through the amino group with the $SO_2$-group and a phenylsulphonic acid radical connected through a nuclear carbon atom with the $SO_2$-group, in acid solution with a 2:8-aminonaphtholsulphonic acid of the formula

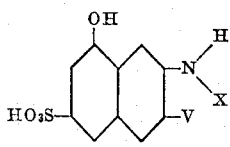

wherein X represents a member of the group consisting of hydrogen and alkyl and V represents a member of the group consisting of hydrogen and a sulphonic acid group (X being hydrogen if V is a sulphonic acid group), and after-treating the obtained disazo-dyestuff with a halogenide of a sulphonic acid of the benzene series.

5. A process for the manufacture of disazo-dyestuffs, which comprises combining a diazotised monoazo-dyestuff of the formula

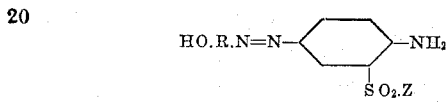

wherein R represents the radical of a phenol coupled in p-position and Z represents a radical of the group consisting of an amino-phenyl-sulphonic acid radical connected through the amino group with the $SO_2$-group and a phenylsulphonic acid radical connected through a nuclear carbon atom with the $SO_2$-group, in acid solution with a 2:8-aminonaphtholsulphonic acid of the formula

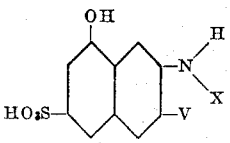

wherein X represents a member of the group consisting of hydrogen and alkyl and V represents a member of the group consisting of hydrogen and a sulphonic acid group (X being hydrogen if V is a sulphonic acid group), and after-treating the obtained disazo-dyestuff with an arylsulphonic acid chloride of the benzene series.

6. A process for the manufacture of disazo dyestuffs which comprises preparing an intermediate of the following formula:

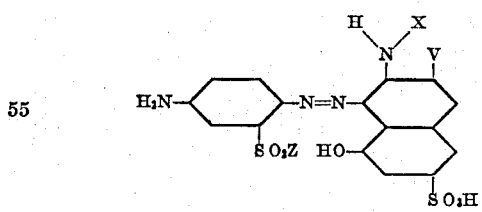

wherein X represents a member of the group consisting of hydrogen and alkyl, V represents a member of the group consisting of hydrogen and sulphonic acid group (X being hydrogen when V represents a sulphonic acid group), Z represents a radical of the group consisting of an amino-phenyl-sulphonic acid radical connected through the amino group with the $SO_2$-group and a phenylsulphonic acid radical connected through a nuclear carbon atom with the $SO_2$-group, and then converting said intermediate by diazotizing and coupling with a phenol capable of coupling in the p-position into a product of the formula

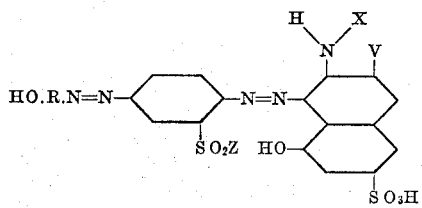

wherein X, V and Z have the meanings above set forth, and R represents the radical of a phenol coupled in p-position, and after-treating the obtained disazodyestuff with an arylsulphonic acid chloride of the benzene series.

7. A process for the manufacture of a disazo-dyestuff, which comprises coupling diazotised 5-nitro - 2 - amino-1:1'-diphenylsulphone - 3'-sulphonic acid with 2-methylamino-8-naphthol-6-sulphonic acid, reducing the nitro group, diazotising the aminomonoazodyestuff thus obtained, coupling with phenol and reacting with p-toluenesulphonic acid chloride.

8. A process for the manufacture of a disazo-dyestuff, which comprises coupling diazotized 5-nitro - 2 - amino-1:1'-phenyl-tolyl-sulphone-3'-sulphonic acid with 2-ethylamino-8-naphthol-6-sulphonic acid, reducing the nitro group, diazotising the aminomonoazodyestuff thus obtained, coupling with phenol and reacting with p-toluene-sulphonic acid chloride.

9. A process for the manufacture of a disazo-dyestuff, which comprises coupling diazotised 5-nitro - 2 - amino-1:1'-diphenylsulphone-3'-sulphonic acid with 2-amino-8-naphthol-3:6-disulphonic acid, reducing the nitro group, diazotising the aminomonoazodyestuff thus obtained, coupling with m-cresol and reacting with p-toluenesulphonic acid chloride.

10. The disazo-dyestuff having the formula

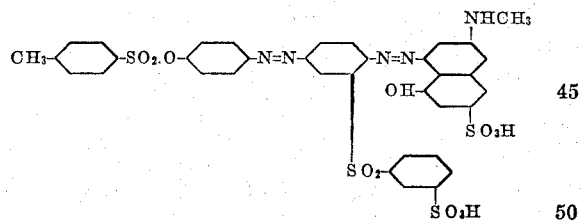

11. The disazo-dyestuff having the formula

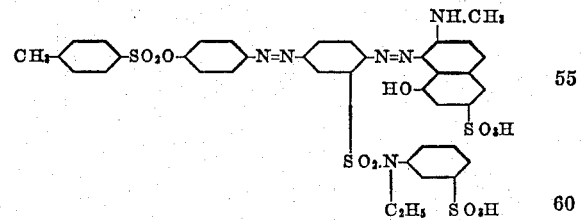

12. The disazo-dyestuff having the formula

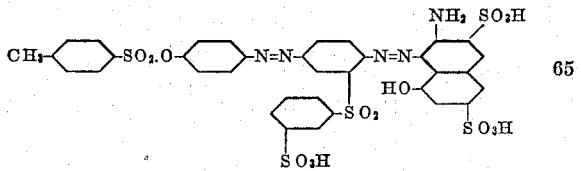

ADOLF KREBSER.